US008773447B1

(12) United States Patent
Donham

(10) Patent No.: US 8,773,447 B1
(45) Date of Patent: Jul. 8, 2014

(54) TAG LOGIC SCOREBOARDING IN A GRAPHICS PIPELINE

(75) Inventor: Christopher D. S. Donham, San Mateo, CA (US)

(73) Assignee: Nvidia Corporation, Santa Clara, CA (US)

( * ) Notice: Subject to any disclaimer, the term of this patent is extended or adjusted under 35 U.S.C. 154(b) by 1201 days.

(21) Appl. No.: 11/636,126

(22) Filed: Dec. 8, 2006

(51) Int. Cl.
*G06T 1/20* (2006.01)
*G06T 1/00* (2006.01)
*G06T 15/40* (2011.01)

(52) U.S. Cl.
USPC ........... 345/506; 345/501; 345/503; 345/421; 345/422

(58) Field of Classification Search
None
See application file for complete search history.

(56) References Cited

U.S. PATENT DOCUMENTS

| 6,718,542 B1* | 4/2004 | Kosche et al. ............... 717/151 |
| 2004/0119710 A1* | 6/2004 | Piazza et al. ................. 345/422 |
| 2007/0030278 A1* | 2/2007 | Prokopenko et al. ......... 345/506 |
| 2007/0236495 A1* | 10/2007 | Gruber et al. ................ 345/422 |

* cited by examiner

*Primary Examiner* — Tize Ma

(57) ABSTRACT

A method for tag logic score boarding in a graphics pipeline of a graphics processor. The method includes receiving a graphics primitive for rasterization in a raster stage of a graphics processor and rasterizing the graphics primitive to generate a plurality of pixels of pixels related to the graphics primitive. The method further includes accounting for an initiation of parameter evaluation for each of the plurality of pixels as the pixels are transmitted to a subsequent stage of the graphics pipeline and accounting for a completion of parameter evaluation for each of the plurality of pixels as the pixels complete processing in the subsequent stage of the graphics pipeline. Respective tag memory is allocated to track the initiation of parameter evaluation and the completion of parameter evaluation for each of the plurality of pixels.

20 Claims, 15 Drawing Sheets

|   | 5 | 6 | 7 | 0 | 1 | 2 | 3 | 4 |   |
|---|---|---|---|---|---|---|---|---|---|
| 7 | 0 | 1 | 2 | 3 | 4 | 5 | 6 | 7 | 0 |
| 2 | 3 | 4 | 5 | 6 | 7 | 0 | 1 | 2 | 3 |
| 5 | 6 | 7 | 0 | 1 | 2 | 3 | 4 | 5 | 6 |
| 0 | 1 | 2 | 3 | 4 | 5 | 6 | 7 | 0 | 1 |
| 3 | 4 | 5 | 6 | 7 | 0 | 1 | 2 | 3 | 4 |
| 6 | 7 | 0 | 1 | 2 | 3 | 4 | 5 | 6 | 7 |
| 1 | 2 | 3 | 4 | 5 | 6 | 7 | 0 | 1 | 2 |
| 4 | 5 | 6 | 7 | 0 | 1 | 2 | 3 | 4 | 5 |
|   | 0 | 1 | 2 | 3 | 4 | 5 | 6 | 7 |   |

FIG. 13

TAG LOGIC SCOREBOARDING IN A GRAPHICS PIPELINE

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives and produce real-time rendered 3-D images.

The real-time rendered 3-D images are generated using rasterization technology. Rasterization technology is widely used in computer graphics systems, and generally refers to the mechanism by which the grid of multiple pixels comprising an image are influenced by the graphics primitives. For each primitive, a typical rasterization system steps from pixel to pixel and determines whether or not to "render" (write a given pixel into a frame buffer or pixel map) as per the contribution of the primitive. This, in turn, determines how to write the data to the display buffer representing each pixel.

Various traversal algorithms and various rasterization methods have been developed for computing all of the pixels covered by the primitive(s) comprising a given 3-D scene. For example, some solutions involve generating the pixels in a unidirectional manner. Such traditional unidirectional solutions involve generating the pixels row-by-row in a constant direction (e.g. left to right). The coverage for each pixel is evaluated to determine if the pixel is inside the primitive being rasterized. This requires that the sequence shift across the primitive to a starting location on a first side of the primitive upon finishing at a location on an opposite side of the primitive.

Other traditional methods involve stepping pixels in a local region following a space filling curve such as a Hilbert curve. The coverage for each pixel is evaluated to determine if the pixel is inside the primitive being rasterized. This technique does not have the large shifts (which can cause inefficiency in the system) of the unidirectional solutions, but is typically more complicated to design. than the unidirectional solution.

Once the primitives are rasterized into their constituent pixels, these pixels are then processed in pipeline stages subsequent to the rasterization stage where the rendering operations are performed. Typically, these rendering operations involve reading the results of prior rendering for a given pixel from the frame buffer, modifying the results based on the current operation, and writing the new values back to the frame buffer. For example, to determine if a particular pixel is visible, the distance from the pixel to the camera is often used. The distance for the current pixel is compared to the closest previous pixel from the frame buffer, and if the current pixel is visible, then the distance for the current pixel is written to the frame buffer for comparison with future pixels. Similarly, rendering operations that assign a color to a pixel often blend the color with the color that resulted from previous rendering operations. Operations in which a frame buffer value is read for a particular pixel, modified, and written back are generally referred to as R-M-W operations. Generally, rendering operations assign a color to each of the pixels of a display in accordance with the degree of coverage of the primitives comprising a scene. The per pixel color is also determined in accordance with texture map information that is assigned to the primitives, lighting information, and the like.

In many systems, the capability of performing R-M-W operations presents a hazard that must be overcome in the system design. In particular, many systems process multiple primitives concurrently. However, most graphics systems present the appearance that primitives are rendered in the order in which they are provided to the GPU. If two sequential primitives utilized R-M-W operations, then the GPU must give the appearance that the value that is written by the first primitive is the value read by the second primitive for any particular pixel. The hazard for the system is how to concurrently process primitives yet maintain the appearance of sequential processing as required by many graphics programming models (e.g. OpenGL or DirectX).

A variety of techniques exist to mitigate the R-M-W hazard depending on the application. A system may maintain a transaction log of the color updates required for a pixel. At the end of rendering a scene, the sorted transaction log may be used to create the final pixel color. Another common solution is referred to as a "scoreboard". A scoreboard is an array of memory that is used to indicate all of the screen locations where rendering of R-M-W operations may be occurring at any given time. When a primitive is rasterized, each pixel is checked against the scoreboard and is only rendered if no other pixel is currently rendering the same location. When rendering for a pixel begins, the scoreboard is marked for the pixel location. Upon completion of rendering, the scoreboard for a location is cleared. In this way, the system can render concurrently pixels in primitives which do not overlap pixels from other primitives, and will render serially any pixels in primitives which do overlap.

A problem exists however with the ability of prior art 3-D rendering architectures to scale to handle the increasingly complex 3-D scenes of today's applications. Computer screens now commonly have screen resolutions of 1920×1200 pixels or larger. In systems which utilize the scoreboard technique to manage the R-M-W hazard, the screen resolution is often so large that a scoreboard which covers the entire screen is prohibitively expensive. As a result, a traditional graphics system may utilize a smaller scoreboard that is mapped to multiple regions on the screen. This mapping process incurs a performance penalty, since primitives that happen to overlap regions that are mapped to the same portion of the scoreboard will be blocked from executing concurrently. Making the scoreboard larger negatively impacts fabrication yield as well as power consumption. Making the scoreboard smaller negatively impacts performance.

Thus, a need exists for a rasterization process that can scale as graphics application needs require and provide added performance without incurring penalties such as increased power consumption and/or reduced fabrication yield.

SUMMARY OF THE INVENTION

Embodiments of the present invention provide a method and system for a rasterization process that can scale as graphics application needs require and provide added performance without incurring penalties such as increased power consumption and/or reduced fabrication yield.

In one embodiment, the present invention is implemented as a method for using tag logic to control scoreboarding in a graphics pipeline of a graphics processor (e.g., a GPU). The method includes receiving a graphics primitive (e.g., a triangle) for rasterization in a raster stage of a graphics processor and rasterizing the graphics primitive to generate a plurality of tiles of pixels (e.g., 16×16 pixel tiles, 8×8 pixel tiles, etc.) related to the graphics primitive. The method further includes accounting for an initiation of parameter evaluation for each of the plurality of tiles as the tiles are transmitted to a subsequent stage of the graphics pipeline, and accounting for a completion of parameter evaluation for each of the plurality of tiles as the tiles complete processing in the subsequent stage. Respective tag memory is allocated to track the initiation of parameter evaluation and the completion of parameter evaluation for each of the plurality of tiles.

In so doing, the accounting for the initiation and the completion of parameter evaluation can ensure that any latency between a fetch of required parameter data and the modification and writeback of the parameter data by a subsequent stage of the graphics pipeline does not corrupt the rendering process. In one embodiment, the accounting for the initiation and the completion of parameter evaluation comprises a "scoreboarding" process that tracks when a tile has drained through the pipeline. In one embodiment, the parameter evaluation comprises depth evaluation.

In one embodiment, a plurality of tags are used to allocate scoreboard tiles on a dynamically mapped basis to track the initiation and the completion of the parameter evaluation. The graphics pipeline can be stalled when all of the tags are used, and unstalled when at least one of the tags becomes unused or otherwise available. Alternatively, in one embodiment, the tag memory and the plurality of tags can be aliased to avoid stalling the graphics pipeline when all of the tags are used.

In one embodiment, a static mapping is used to allocate scoreboard tiles to track the initiation and the completion of the parameter evaluation. By mapping tiles of scoreboard memory rather than the entire scoreboard, the scoreboard will be blocked less often for geometry which overlaps multiple scoreboard regions.

In this manner, embodiments of the present invention provide a method and system for a rasterization process that can scale as graphics application needs require. A scoreboarding process in accordance with embodiments of the present invention is not limited to any preset screen size, thereby enabling a smooth upscaling of the scoreboarding process to accommodate a larger number of tiles in flight through the graphics pipeline.

BRIEF DESCRIPTION OF THE DRAWINGS

The present invention is illustrated by way of example, and not by way of limitation, in the figures of the accompanying drawings and in which like reference numerals refer to similar elements.

FIG. 13 shows a tile mapping scenario where a primitive falls on a 45 degree angle and thus causes aliasing across 32 pixels.

DETAILED DESCRIPTION OF THE INVENTION

Figure 1:
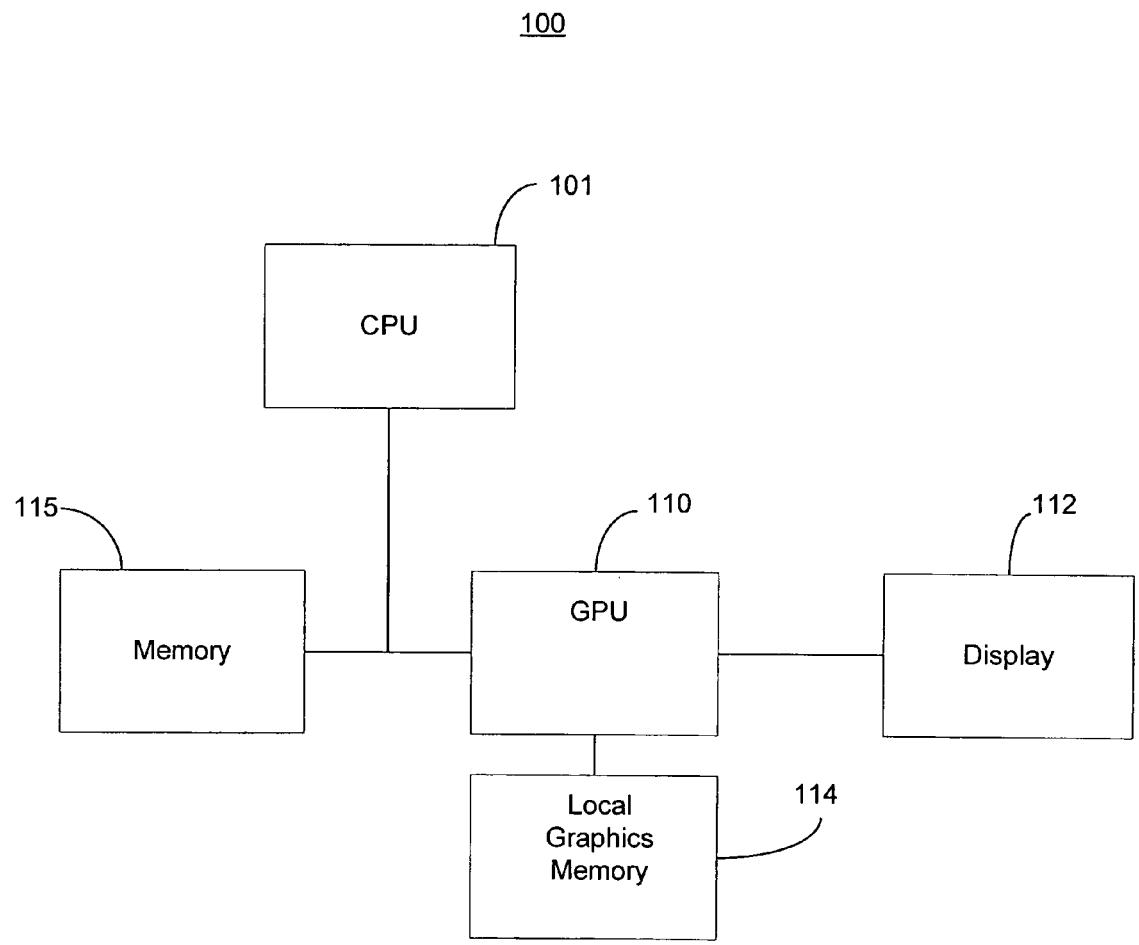
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.
Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, JO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

Embodiments of the Invention

Embodiments of the present invention implement a method and system for tag logic score boarding in a graphics pipeline of a graphics processor (e.g., GPU 110 of FIG. 1). The method includes receiving a graphics primitive (e.g., a triangle polygon) for rasterization in a raster stage of the GPU 110 and rasterizing the graphics primitive to generate a plurality of tiles of pixels (e.g., 16×16 pixel tiles, 8×8 pixel tiles, etc.) related to the graphics primitive. The scoreboarding includes accounting for an initiation of parameter evaluation for each of the plurality of tiles they are transmitted to a subsequent stage (e.g., shader, etc.) of the graphics pipeline and accounting for a completion of the parameter evaluation for each of the tiles as they complete processing in the subsequent stage. The scoreboarding utilizes a respective tag memory that is allocated to track the initiation and the completion of parameter evaluation for each of the tiles.

Figure 2:
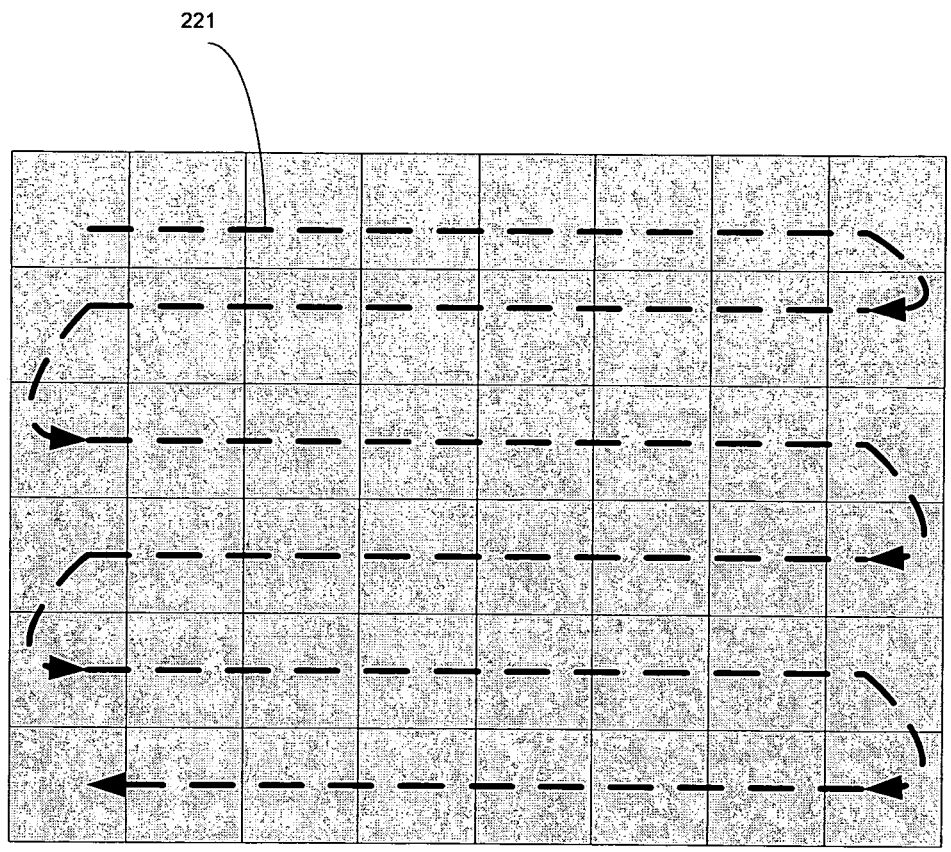
FIG. 2 shows a diagram depicting a grid of pixels being rasterized in a boustrophedonic pattern in accordance with one embodiment of the present invention.

FIG. 2 shows a diagram depicting a grid of pixels being rasterized in a boustrophedonic pattern in accordance with one embodiment of the present invention.

In one embodiment, as depicted in FIG. 2, a raster stage of the GPU 110 utilizes a boustrophedonic pattern for traversing a graphics primitive. As depicted in FIG. 2, the boustrophedonic pattern is indicated by the dotted line 221. In such an embodiment, each pixel of the grid of pixels is traversed in the order indicated by the line 221. The line 221 shows a boustrophedonic pattern of traversal, where the term "boustrophedonic" refers to a traversal pattern which visits all pixels on a 2D area by scanning back and forth along one axis as each pass moves farther along on the orthogonal axis, much as a farmer would plow or mow a field. The term boustrophedonic generally means "as the oxen plows" as in, for example, a field.

Thus, as depicted in FIG. 2, this boustrophedonic rasterization refers to a serpentine pattern that folds back and forth along a predominant axis. In the FIG. 2 example, the predominant axis is horizontal. A horizontal boustrophedonic sequence, for example, may generate all the pixels within a primitive triangle that are on one row from left to right, and then generate the next row right to left, and so on. Such a folded path ensures that an average distance from a generated pixel to recently previously generated pixels is relatively small. Additionally, it should be noted that the boustrophedonic traversal pattern can be implemented on a tile-by-tile basis (e.g., from a generated tile to a recently previously generated tile) as opposed to a pixel-by-pixel basis.

The boustrophedonic pattern has advantages for maintaining a cache of relevant data and reducing the memory requests required for frame buffer and texture access. For example, generating pixels that are near recently generated pixels is important when recent groups of pixels and/or their corresponding texture values are kept in memories of a limited size (e.g., cache memories, etc.). Additional details regarding boustrophedonic pattern rasterization can be found in U.S. patent application "A GPU HAVING RASTER COMPONENTS CONFIGURED FOR USING NESTED BOUSTROPHEDONIC PATTERNS TO TRAVERSE SCREEN AREAS" by Franklin C. Crow et al., Ser. No. 11/304,904, filed on Dec. 15, 2005, which is incorporated herein in its entirety.

It should be noted that although embodiments of the present invention are described in the context of boustrophedonic rasterization, other types of rasterization patterns can be used. For example, the algorithms and GPU stages described herein for rasterizing tile groups can be readily applied to traditional left-to-right, line-by-line rasterization patterns.

Figure 3:
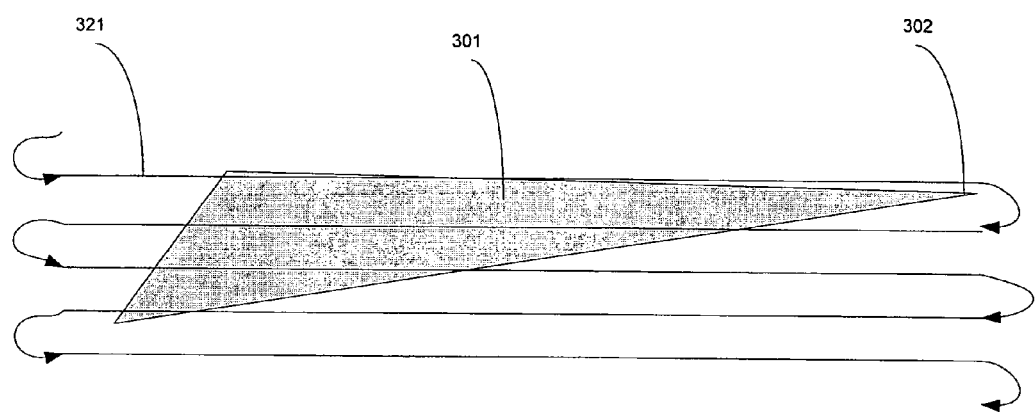
FIG. 3 shows a diagram of a triangle polygon against a rasterization pattern for a raster unit of a GPU in accordance with one embodiment of the present invention.

FIG. 3 shows a diagram of a triangle polygon 301 (e.g., triangle 301) against a rasterization pattern 321 for a raster unit of the GPU 110 in accordance with one embodiment of the present invention.

As described above, the line 321 shows a boustrophedonic pattern of traversal, where the raster unit visits all pixels on a 2D area of the triangle 301 by scanning along one axis as each pass moves farther along on the orthogonal axis. As shown in the FIG. 3 embodiment, a raster unit of the GPU 110 traverses the triangle 301 and stamps out tiles that have at least some coverage with respect to the triangle 301. The resulting tiles subsequently sent down the graphics pipeline for further processing.

Figure 4:
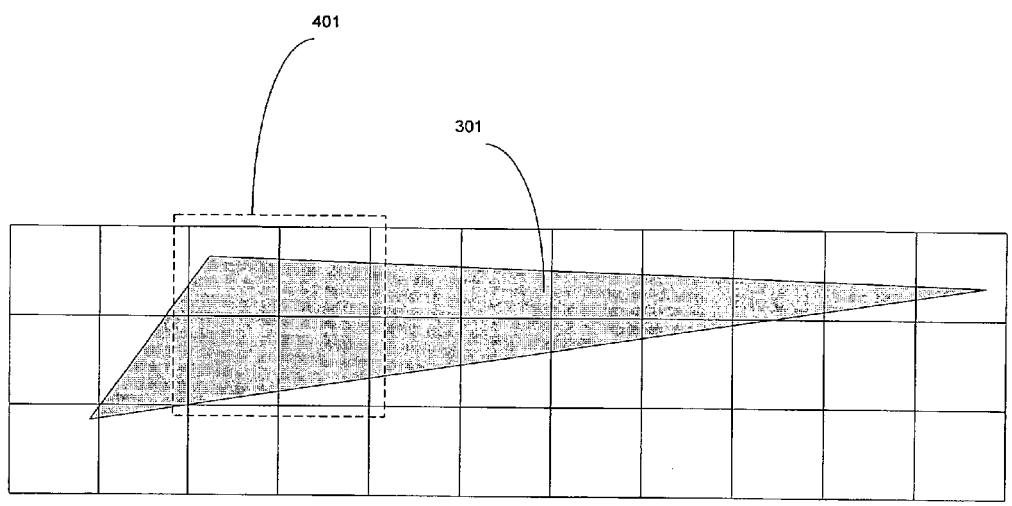
FIG. 4 shows a diagram of the triangle against a grid of tiles as they are being examined by the rasterizer unit in accordance with one embodiment of the present invention.

FIG. 4 shows a diagram of the triangle 301 against a grid of tiles as they are examined by the first level rasterization process in accordance with one embodiment of the present invention. In FIG. 4, each of the illustrated squares represents a tile comprised of pixels (e.g., 16×16, 8×8, etc.). FIG. 4 shows a case where the rasterization process performed by the raster unit of the GPU 110 produces tile groups comprised of four tiles each, such as the exemplary tile group 401. Thus, in a case where each tile comprises 16×16 pixels, the raster unit of the GPU 110 can stamp out a 1024 pixel tile group each clock cycle. The generation of such large tile groups can be considered as a form of coarse rasterization, where large groups of pixels are considered at one time to quickly determine which pixels of a large screen area (e.g., 1600×1200, 1920×1200 etc.) are relevant and which pixels of the screen area can be discarded. The large tile groups can be examined in detail in a subsequent stage, where each pixel, or small group of pixels (e.g., 2×2 pixels), of the large tile group is examined to determine a more fine degree of coverage by the triangle 301.

In this manner, a coarse rasterization is intended to quickly determine which pixels of the screen area relate to a given graphics primitive. Accordingly, relatively large groups of pixels (e.g., tiles) are examined at a time in order to quickly find those pixels that relate to the primitive. The process can be compared to a reconnaissance, whereby the coarse raster unit quickly scans a screen area and finds tiles that cover the triangle 301. Thus the pixels that relate to the triangle 301 can be discovered much more quickly than a traditional prior art process which utilizes a single level of rasterization and examines much smaller numbers of pixels at a time, in a more fine-grained manner.

Figure 5:
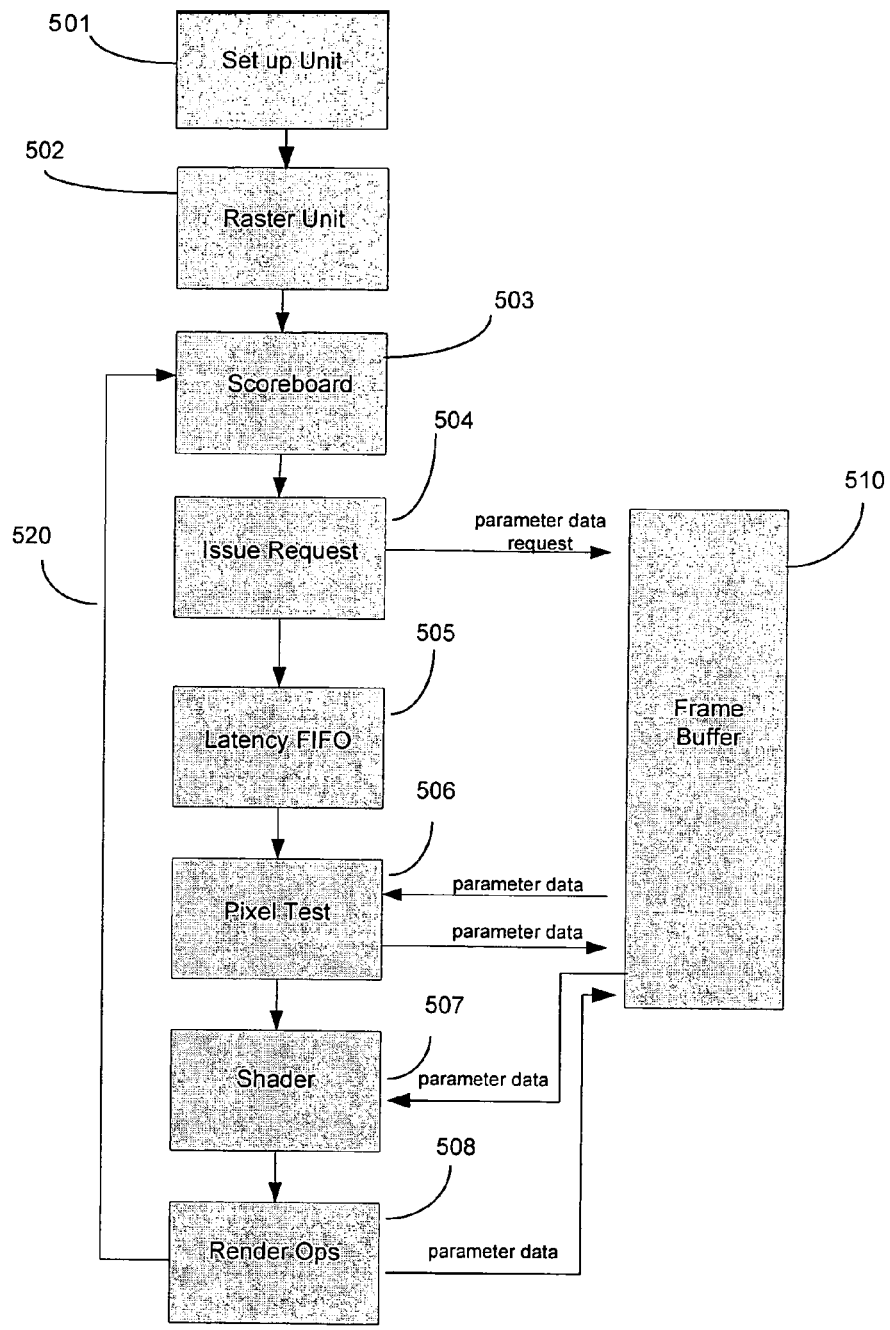
FIG. 5 shows a diagram depicting a graphics pipeline in accordance with one embodiment of the present invention.

FIG. 5 shows a diagram depicting a graphics pipeline in accordance with one embodiment of the present invention.

The FIG. 5 embodiment illustrates exemplary internal components comprising a pipeline of the GPU 110. As shown in FIG. 5, the GPU 110 includes a setup unit 501 and a rasterizer unit 502. Generally, the set up unit 501 functions by converting descriptions based on vertices to descriptions based on edge descriptions. The rasterizer unit 502 subsequently converts these edge descriptions into filled areas comprising actual pixel descriptions (e.g., pixel areas, pixel sub-samples, etc.). The pixel descriptions are subsequently passed along to other units within the GPU 110 for further processing and rendering.

The scoreboard unit 503 functions by accounting for the initiation of a parameter evaluation for each of the tiles received from the raster unit 502. As tiles are received by the raster unit 502, the scoreboard unit 503 accounts for their processing initiation by using a scoreboard data structure. Once a given tile is accounted for, that tile is passed on to the issue request unit 504 which issues parameter requests to support the parameter evaluation in the subsequent pixel test stage 506.

The parameter evaluation process can be one of the number of different evaluation processes, or pixel tests, which determine the degree to which the tiles from a given primitive influence pixel colors in the frame buffer 510. For example, the parameter evaluation process can be a depth evaluation process, where, for example, depth values for the tiles passed from the raster unit 502 are tested against the depth values for those pixels are already residing within the frame buffer 510. Alternatively, the parameter evaluation process can be a transparency evaluation, where a transparency value for the tiles passed in raster unit are tested against the pixels already in the frame buffer. The objective is to identify tiles which will not ultimately be drawn in the frame buffer 510 and discard them to save processing bandwith. For example, in a case where the parameter comprises a depth value, the objective is to identify those tiles which are behind other primitives, or are otherwise occluded, and discard them from the pipeline. The frame buffer 510 can be implemented as a portion of the local graphics memory 114 shown in FIG. 1, or alternatively, as a portion of the system memory 115.

The scoreboard unit 503 functions by covering for the latency between the initial parameter data request as performed by the issue request unit 504 and the amount of time until the parameter data is returned from the frame buffer 510 and utilized by pixel test unit 506. The latency FIFO 505 incorporates a comparatively deep FIFO (e.g., 32 stages or more) in order to maintain a large number of pixel data requests in flight. The scoreboard unit 503 keeps track of the in-flight parameter data requests that have not yet resulted in an update of the frame buffer. Such in-flight parameter data requests are tracked by the scoreboard unit 503 to avoid read-modify-write data hazards, where stale parameter data is fetched from the frame buffer 510 prior to modified parameter data being written back to the frame buffer 510.

The pixel test unit 506 receives the parameter data corresponding to the parameter data requests issued by the issue request unit 504. The pixel test unit 506 then performs the parameter evaluation (e.g., transparency test, depth test, etc.) and updates the parameter values for the tiles, writes back the updated parameter data to the frame buffer 510, and passes the tiles on to the shader unit 507 for shader processing.

The shader unit 507 performs pixel shader processing for each of the pixels comprising the tiles. The shader unit 507 typically breaks the tiles into pixel "quads" (e.g., 2×2 pixels) and operates on the quads in accordance with the parameters iterated across each of the pixels. Once the shader unit 507 completes operation on a tile, the tile is transmitted to render operations unit 508. Render operations unit 508 performs back end rendering operations on the pixel quads received from the shader unit, and writes the completed pixels to frame buffer 510. The render operations unit 508 also transmits completion information to the scoreboard unit 503 (e.g., via line 520) to allow an update of its scoreboard data structure.

In this manner, the scoreboard unit 503 enables the accounting for the initiation and the completion of parameter evaluation to ensure a latency between a fetch of required parameter data and the modification and writeback of the parameter data by a subsequent stage of the graphics pipeline does not corrupt the rendering process.

Figure 6:
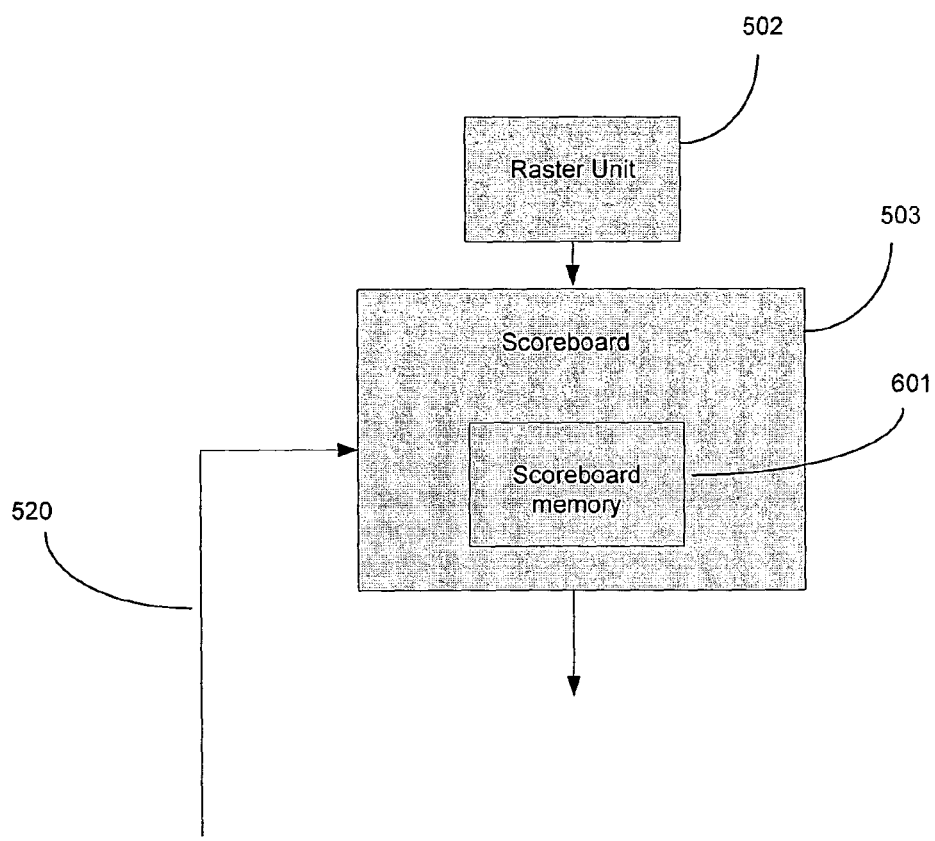
FIG. 6 shows a diagram depicting the scoreboard unit and an internal scoreboard memory in accordance with one embodiment of the present invention.

FIG. 6 shows a diagram depicting the scoreboard unit 503 and an internal scoreboard memory 601 in accordance with one embodiment of the present invention. FIG. 6 also shows the line 520 for receiving completion information from the shader unit 507 of FIG. 5.

As described above, the scoreboard unit 503 keeps track of the in-flight parameter data requests that have not yet resulted in an update of the frame buffer. Such in-flight parameter data requests are tracked by the scoreboard unit 503 to avoid read-modify-write data hazards, where stale parameter data is fetched from the frame buffer 510 prior to modified parameter data being written back to the frame buffer 510. In the FIG. 5 embodiment, a scoreboard memory 601 is used to keep track of tiles which are in-flight and have not yet resulted in a frame buffer update.

In one embodiment, the scoreboard memory 601 is used to store a plurality of tags which are in turn used to allocate the tag memory on a dynamically mapped basis to track the initiation and the completion of parameter evaluation for each of the plurality of tiles. For example, in one embodiment, for a 2K pixel×2K pixel surface, there are a total of 8 scoreboard tiles where each tile is 16×16 pixels. In such an embodiment, each tile can be thought of as a cache line which behaves like, and can be handled in a manner similar to, a mapped texture in a texture cache. In such an embodiment, the scoreboard memory 601 becomes a cache storage memory which can be allocated on an as needed basis. For example, by using a 14 bit tag and a total of 8 tags, scoreboard tiles could be allocated based on the needs of a particular primitive being rendered.

Figure 7:
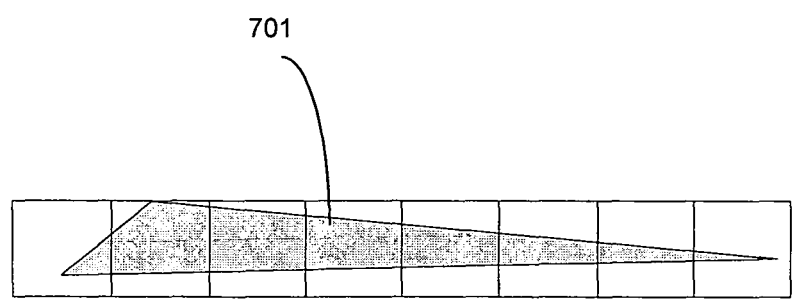
FIG. 7 shows an example where 8 tiles are used to cover a triangle polygon from left to right as shown.

FIG. 7 shows an example where 8 tiles are used to cover a triangle polygon 701 from left to right as shown. The 8 tags corresponding to each of the 8 tiles can be allocated out of the scoreboard memory 601 without regard to their screen geometry. In this case, the 8 tiles are laid out side to side from left to right.

Figure 8:
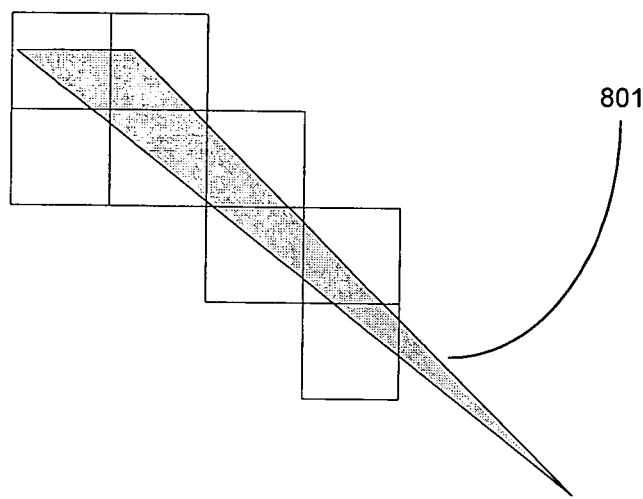
FIG. 8 shows an example where 8 tiles are used to cover a triangle polygon in a more arbitrary manner.

FIG. 8 shows an example where 8 tiles are used to cover a triangle polygon 801 in a more arbitrary manner as shown. The 8 tags corresponding to each of the 8 tiles can be allocated out of the scoreboard memory 601 in a comparatively arbitrary manner with regard to their screen geometry.

FIG. 8 also illustrates a problematic case, where the use of the 8 tiles does not completely cover the triangle polygon 801. In one embodiment, when the tile memory of the scoreboard memory 601 is full, the scoreboard unit 503 stalls the graphics pipeline until one or more tiles can drain through and free up tile memory. Once tile memory is freed, the graphics pipeline can be unstalled for further processing. Thus, a finite amount of scoreboard memory 601 can lead to problems which can lead to an undesirable stalling of the graphics pipeline.

In one embodiment, to reduce the occurrence of stalling, the tile sizes punched out by the raster unit 502 can be made smaller. For example, by making the tiles 8×8 rather than 16×16, the tags become 16 bits for a 2K×2K pixel screen, and there are a total of 16 tags. At 256 bits total of tag memory, the tags are not yet too large and the distance a line can travel before running out of scoreboard space is increased.

In one embodiment, aliasing of the scoreboard memory 601 can be further utilized to avoid graphics pipeline stalling. For example, the tag memory and the plurality of tags stored in the scoreboard memory 601 can be aliased to avoid stalling the graphics pipeline when all of the tags are used. For example, in one embodiment, comparatively small cache tags can be used (e.g., 8×8 pixels) and 8 of these cache tags can map a 16×16 region of tiles, but aliasing the screen on 128×128 macro-tiles. This limits the size of the cache tags (e.g., now only 8 bits total). For example, when drawing a horizontal line and all 8 tags are used, the scoreboard unit 503 is also transitioning to a new aliased region. Additionally, it should be noted that the memory aliasing embodiment allows for aliasing in a manner similar to a prior art fixed mapping technique without building any hard limits on screen size. Scoreboard aliasing embodiments of the present invention are further described below.

Figure 9:
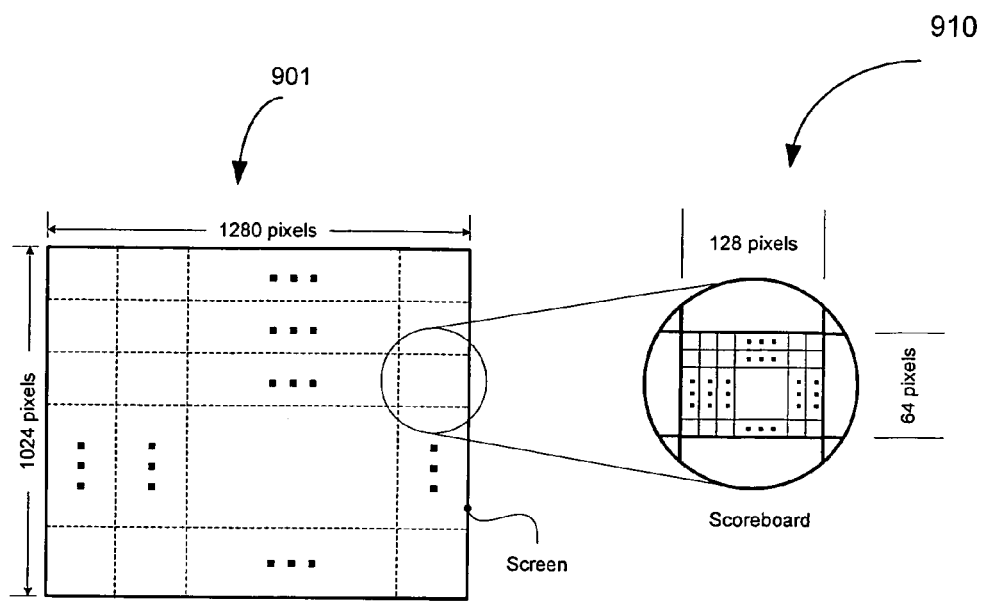
FIG. 9 shows a diagram of a typical mapping of the scoreboard to the screen area of a display.

FIG. 9 shows a diagram of a typical mapping of the scoreboard to the screen area of a display. As depicted in FIG. 9, the screen area 901 as resolution of 1280×1024 pixels, and the scoreboard is a 128×64 pixel scoreboard. As described above, the scoreboard memory can be aliased to avoid stalling the graphics pipeline when all the tags are used. Consequently, in the situation depicted by FIG. 9, the scoreboard memory is mapped 10 times horizontally and 16 times vertically as shown by a close-up of the region 910.

Figure 10:
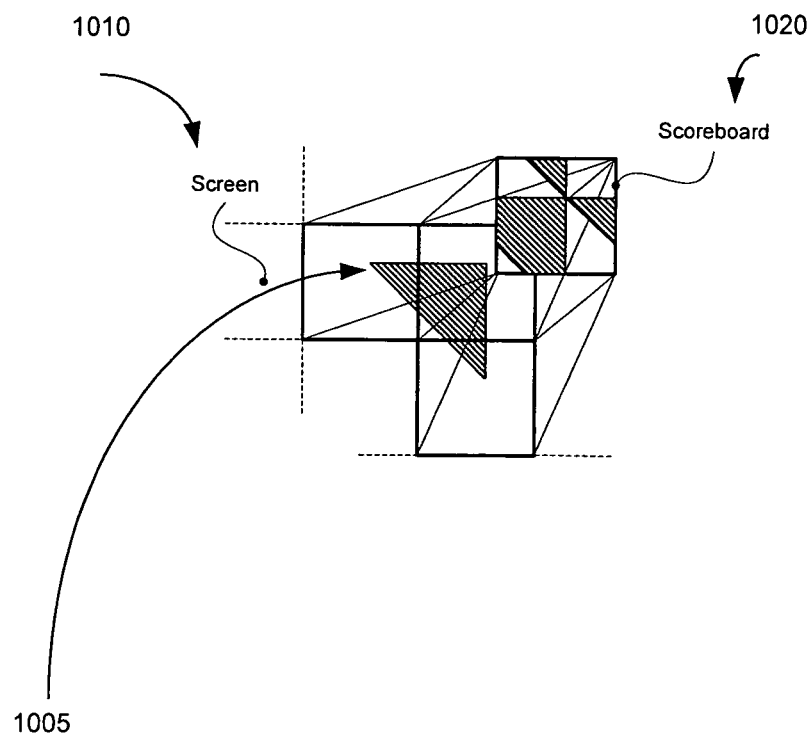
FIG. 10 shows a diagram depicting a conventional scoreboard mapping in an aliased situation.

FIG. 10 shows a diagram depicting a conventional scoreboard mapping in an aliased situation. As illustrated in FIG. 10, in a typical scoreboard mapping, the scoreboard 1020 is mapped to adjacent regions of the screen 1010. A triangle 1005 that overlaps the scoreboard boundaries is "wrapped" back into the scoreboard 1020.

Figure 11:
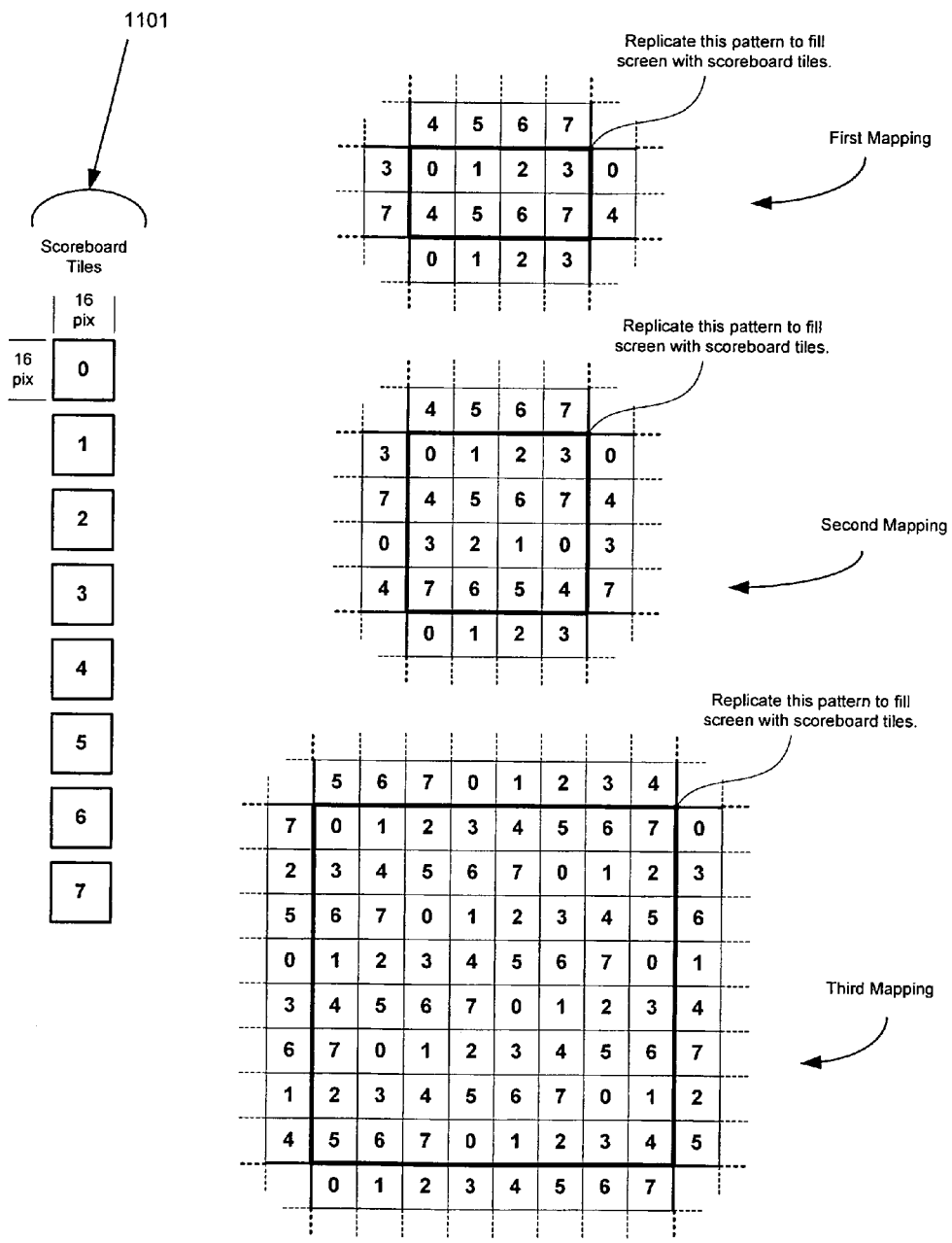
FIG. 11 shows and aliased scoreboard mapping scenario in accordance with one embodiment of the present invention.

FIG. 11 shows an aliased scoreboard mapping scenario in accordance with one embodiment of the present invention. The left-hand side of FIG. 11 shows eight scoreboard tiles 1101, numbered 0 through 7, comprising 16×16 pixels each. Thus, as described above, instead of mapping the scoreboard to the screen as a contiguous block, the present embodiment divides the scoreboard into tiles (e.g., tiles 1101). The mapping of the tiles into the screen space is now flexible.

In the first mapping scenario, the layout of the tiles 1101 is done in a conventional manner, such that the tile layout produces a contiguous scoreboard block corresponding to the screen. The first mapping scenario suffers from scoreboard aliasing after 64 pixels horizontally and 32 pixels vertically. In the second mapping scenario, the situation is improved, since the scoreboard suffers aliasing after 64 pixels vertically. The third mapping scenario offers much improved performance, since in the third mapping scenario the scoreboard aliases only after 128 pixels vertically and 128 pixels horizontally.

Figure 12:
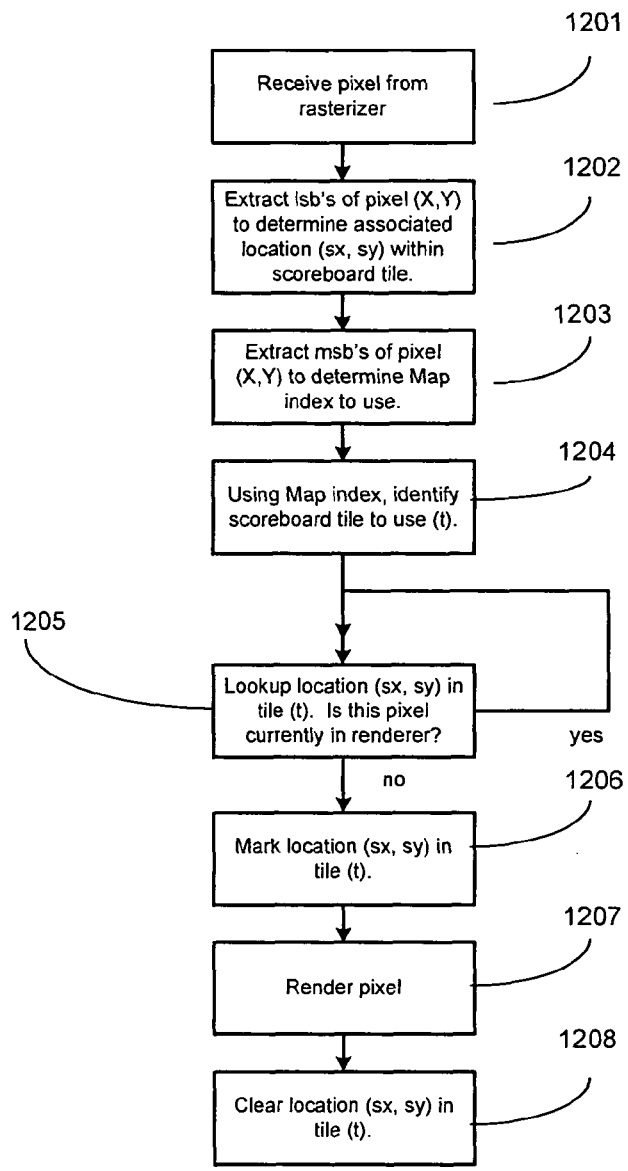
FIG. 12 shows a flowchart of the steps of a first process for determining scoreboard tile location and use for a given screen area in accordance with one embodiment of the present invention.

FIG. 12 shows a flowchart of the steps of a process 1200 for determining scoreboard tile location and use for a given screen area in accordance with one embodiment of the present invention. As depicted by the steps 1201-1208, process 1200 utilizes the screen location (x,y) of a pixel to determine the scoreboard tile and a location within the tile to use. For example, if a 16×16 scoreboard tile is used, then the bottom 4 lsb's of the pixel screen (X,Y) location are used for the (sx, sy) location within the scoreboard tile. The remaining bits of the screen (X,Y) location are used to determine the Map index to use. For example, to implement the third mapping scenario depicted in FIG. 11 above, the bottom 3 lsb's of the remaining bits of (X,Y) specify the location (ix, iy) in the mapping table shown in the third mapping scenario.

FIG. 13 shows a tile mapping scenario where a primitive falls on a 45 degree angle and thus causes aliasing across 32 pixels. This shown as the circled region 1301, which includes tiles 0 and tile 4, which both appear four times in the mapping scenario.

Figure 14:
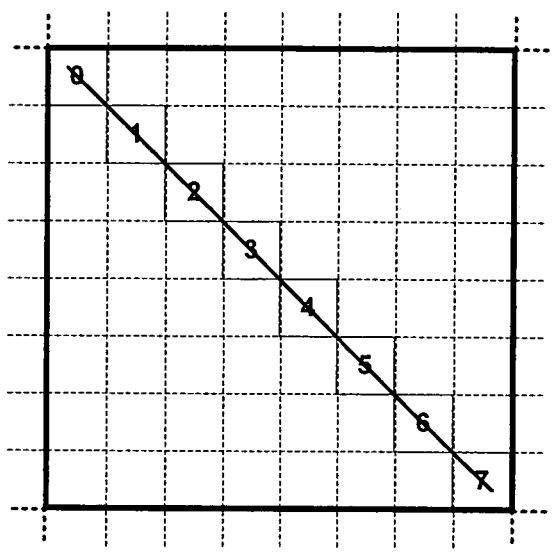
FIG. 14 shows the manner in which one embodiment of the flexible mapping of scoreboard tiles is used to dynamically handle such diagonal primitives as the example illustrated in FIG. 13.

FIG. 14 shows the manner in which one embodiment of the flexible mapping of scoreboard tiles is used to dynamically handle such diagonal primitives as the example illustrated in FIG. 13 above. Instead of using a fixed mapping, as described above, the present embodiment uses a dynamic mapping. When the rasterizer generates a pixel at a particular location on the screen, the present embodiment uses tag hardware to determine if a scoreboard tile exists for the screen location. If so, then the pixel is tested against the scoreboard tile to determine if another pixel exists at the same location in screen space. When no other pixels exist at the same location, the tile is marked for the current pixel. When the pixel completes rendering, the scoreboard tile is cleared.

Thus, if no tile exists for the current screen location, the tag logic allocates a scoreboard tile from the pool of tiles that are not in use. A tile is in use while a pixel exists that marked a particular tile. In the example shown in FIG. 14, a 45 degree line is being drawn causing tiles (e.g., tiles 0 through 7) to be allocated along a diagonal. Accordingly, in this scenario, no aliasing occurs.

Figure 15:
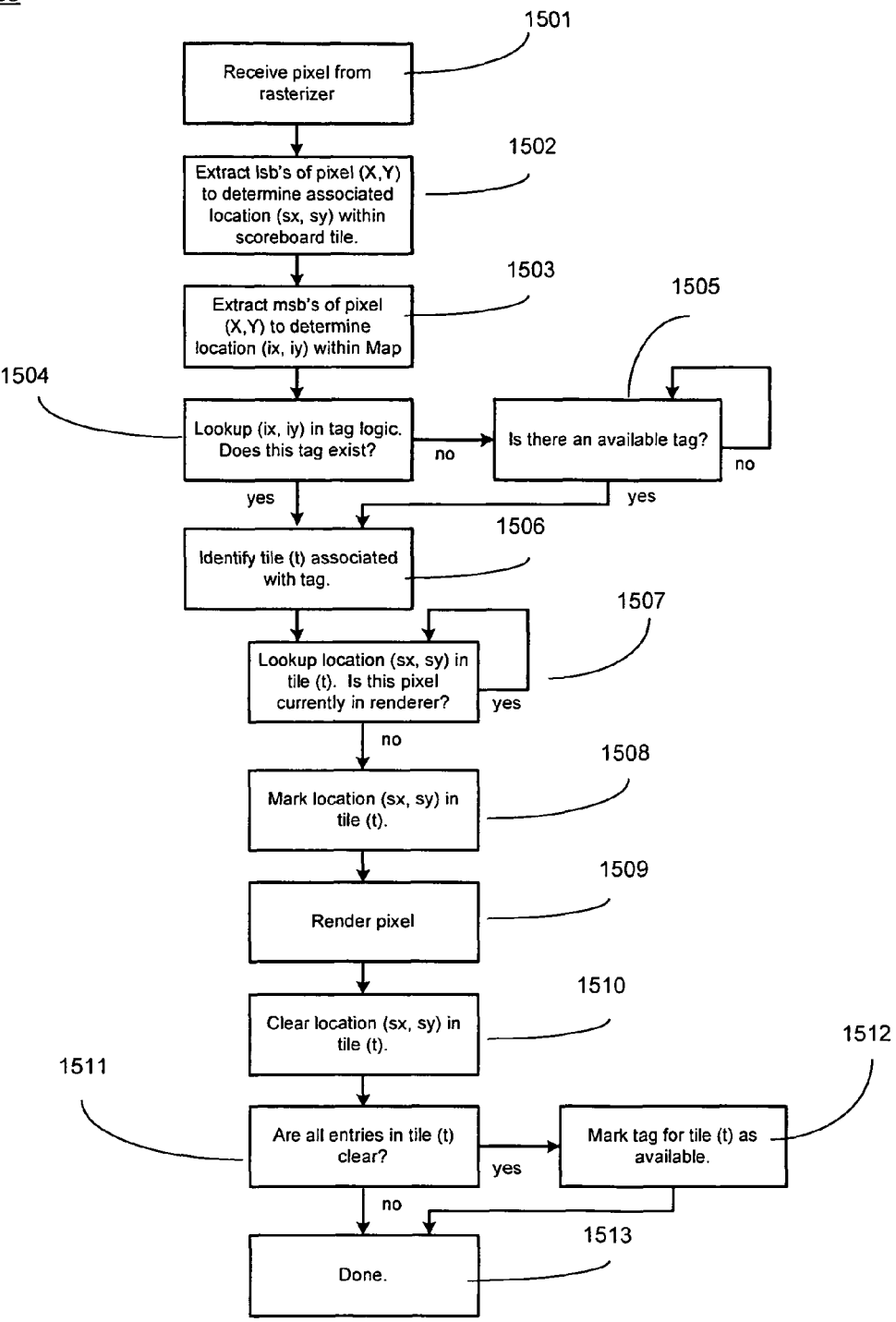
FIG. 15 shows a flowchart of the steps of a second process for determining scoreboard tile location and use for a given screen area in accordance with one embodiment of the present invention.

FIG. 15 shows a flowchart of the steps of a process 1500 for determining scoreboard tile location and use for a given screen area in accordance with one embodiment of the present invention. As depicted by the steps 1501-1513, the screen (X, Y) location of a pixel is used to determine the location within the scoreboard tile to use. Tag logic is used in conjunction with the screen (X, Y) location of the pixel to determine which scoreboard tile to use. For example, if a 16×16 scoreboard tile is used, then the bottom 4 lsb's of the pixel screen (X,Y) location are used for the (sx, sy) location within the scoreboard tile. The remaining bits (ix, iy) of the screen location are compared against the tags in the tag logic. A tag that matches identifies the associated tile to use for the pixel. If none of the tags match, then the system stalls waiting for a tag to become available.

It should be noted that it might be advantageous to only use some of the bits of (ix, iy) with the tag logic. As with the static mapping, the unused bits of the screen (X,Y) location allow the scoreboard mapping to wrap. This wrapping can allow triangles which extend for a protracted length in a particular direction to reuse scoreboard tiles to achieve greater performance.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a graphics pipeline of a graphics processor, a method for tag logic score boarding, comprising:
   receiving a graphics primitive for rasterization in a raster stage of a graphics processor;
   rasterizing the graphics primitive to generate a plurality pixels related to the graphics primitive;
   accounting for an initiation of parameter evaluation for each of the plurality of pixels as the pixels are transmitted to a subsequent stage of the graphics pipeline;
   accounting for a completion of parameter evaluation for each of the plurality of pixels as the pixels complete processing in the subsequent stage of the graphics pipeline; and
   allocating respective tag memory to track the initiation of parameter evaluation and the completion of parameter evaluation for each of the plurality of pixels to account for pixels being processed, wherein a scoreboard unit keeps track of in-flight parameter data request that have not yet resulted in an update of the frame buffer, wherein said in-flight parameter data requests are tracked by the scoreboard unit to avoid read-modify-write data hazards.

2. The method of claim 1, wherein the accounting for the initiation of parameter evaluation and the accounting for the completion of parameter evaluation comprises scoreboarding.

3. The method of claim 1, wherein the parameter evaluation comprises depth evaluation.

4. The method of claim 1, wherein a plurality of tags are used to allocate the tag memory on a dynamically mapped basis to track the initiation and the completion of parameter evaluation for each of the plurality of pixels.

5. The method of claim 4, further comprising:
   stalling the graphics pipeline when all of the tags are used to indicate the initiation of parameter evaluation; and
   unstalling the graphics pipeline when at least one of the tags becomes unused.

6. The method of claim 4, further comprising:
   aliasing the tag memory and the plurality of tags to avoid stalling the graphics pipeline when all of the tags are used.

7. A GPU (graphics processor unit), comprising:
   a set-up unit for generating polygon descriptions;
   a rasterizer unit coupled to the set-up unit for rasterizing the polygon descriptions;
   a scoreboard unit to account for the completion of parameter evaluation, wherein the scoreboard unit is configured for:
      accounting for an initiation of parameter evaluation for each of the plurality of pixels as the pixels are transmitted to a subsequent stage of the graphics pipeline;
      accounting for a completion of parameter evaluation for each of the plurality of pixels as the pixels complete processing in the subsequent stage of the graphics pipeline; and
      allocating respective tag memory to track the initiation of parameter evaluation and the completion of parameter evaluation for each of the plurality of pixels to account for pixels being processed, wherein a scoreboard unit keeps track of in-flight parameter data request that have not yet resulted in an update of the frame buffer, wherein said in-flight parameter data requests are tracked by the scoreboard unit to avoid read-modify-write data hazards.

8. The GPU of claim 7, wherein the accounting for the initiation of parameter evaluation and the accounting for the completion of parameter evaluation comprises scoreboarding.

9. The GPU of claim 7, wherein the parameter evaluation comprises depth evaluation.

10. The GPU of claim 7, wherein a plurality of tags are used to allocate the tag memory on a dynamically mapped basis to track the initiation and the completion of parameter evaluation for each of the plurality of pixels.

11. The GPU of claim 10, further comprising:
    stalling the graphics pipeline when all of the tags are used to indicate the initiation of parameter evaluation; and
    unstalling the graphics pipeline when at least one of the tags becomes unused.

12. The GPU of claim 10, further comprising:
    aliasing the tag memory and the plurality of tags to avoid stalling the graphics pipeline when all of the tags are used.

13. A computer system, comprising:
    a system memory;
    a central processor unit coupled to the system memory; and
    a graphics processor unit communicatively coupled to the central processor unit;
    a set-up unit within the graphics processor unit for generating polygon descriptions;
    a rasterizer unit within the graphics processor unit and coupled to the set-up unit for rasterizing the polygon descriptions; and a scoreboard unit to account for the completion of parameter evaluation, wherein the scoreboard unit is configured to account for an initiation of parameter evaluation for each of the plurality of pixels as the pixels are transmitted to a subsequent stage of the graphics pipeline, and to account for a completion of parameter evaluation for each of the plurality of pixels as the pixels complete processing in the subsequent stage of the graphics pipeline, wherein a scoreboard unit keeps track of in-flight parameter data request that have not yet resulted in an update of the frame buffer, wherein said in-flight parameter data requests are tracked by the scoreboard unit to avoid read-modify-write data hazards.

14. The computer system of claim 13, wherein the accounting for the initiation of parameter evaluation and the accounting for the completion of parameter evaluation comprises scoreboarding.

15. The computer system of claim 13, wherein the parameter evaluation comprises depth evaluation.

16. The computer system of claim 13, wherein a plurality of tags are used to allocate the tag memory on a dynamically mapped basis to track the initiation and the completion of parameter evaluation for each of the plurality of pixels.

17. The computer system of claim 16, further comprising:
stalling the graphics pipeline when all of the tags are used to indicate the initiation of parameter evaluation; and
uninstalling the graphics pipeline when at least one of the tags becomes unused.

18. The computer system of claim 16, further comprising:
aliasing the tag memory and the plurality of tags to avoid stalling the graphics pipeline when all of the tags are used.

19. The computer system claim 16, wherein the tag memory is allocated on a statically mapped basis to track the initiation and the completion of parameter evaluation for each of the plurality of pixels.

20. The computer system of claim 19, wherein the tag memory and the plurality of tags are aliased to avoid stalling the graphics pipeline when all of the tags are used.

* * * * *